US009940783B2

(12) United States Patent
Simmer

(10) Patent No.: US 9,940,783 B2
(45) Date of Patent: Apr. 10, 2018

(54) AUTOMATED HAND STRENGTH ESTIMATION FOR CARD GAMES

(71) Applicant: Zynga Inc., San Francisco, CA (US)

(72) Inventor: Jarred Wesley Simmer, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 278 days.

(21) Appl. No.: 14/671,647

(22) Filed: Mar. 27, 2015

(65) Prior Publication Data

US 2016/0284155 A1 Sep. 29, 2016

(51) Int. Cl.
*G06F 17/00* (2006.01)
*G07F 17/32* (2006.01)

(52) U.S. Cl.
CPC ........ *G07F 17/323* (2013.01); *G07F 17/3223* (2013.01); *G07F 17/3293* (2013.01)

(58) Field of Classification Search
None
See application file for complete search history.

(56) References Cited

U.S. PATENT DOCUMENTS 9,011,226 B2 * 4/2015 Montano ............ G07F 17/3262 463/13
9,129,486 B2 * 9/2015 Nicely ............ G07F 17/3293
9,345,960 B2 * 5/2016 Lark ............ G07F 17/3293
2004/0204213 A1 * 10/2004 Schugar ............ G07F 17/32 463/6
2007/0117604 A1 * 5/2007 Hill ............ G07F 17/32 463/16
2008/0064467 A1 * 3/2008 Reiner ............ G07F 17/3267 463/16
2009/0124316 A1 * 5/2009 Baerlocher ......... G07F 17/3227 463/13
2010/0004051 A1 * 1/2010 Walker ............ G07F 17/32 463/22
2010/0190552 A1 * 7/2010 Rasmussen ......... G07F 17/3211 463/34
2012/0108332 A1 * 5/2012 Baseley ............ A63F 13/42 463/31

OTHER PUBLICATIONS

"Cactus Key's Poker Hand Evaluator", [Online]. Retrieved from the Internet: <URL: http://suffe.cool/poker/evaluator.html, (Accessed Mar. 25, 2015), 5 pgs.
"Monte Carlo method", Wikipedia, [Online]. Retrieved from the Internet: <URL: http://en.wikipedia.org/wiki/Monte_Carlo_method, (Accessed Mar. 25, 2015), 20 pgs.

* cited by examiner

*Primary Examiner* — Paul A D'Agostino
(74) *Attorney, Agent, or Firm* — Schwegman Lundberg & Woessner, P.A.

(57) ABSTRACT

In various embodiments, a method of estimating odds that a player will win a round of a card game is disclosed. Information is received pertaining to cards that have been dealt from a deck at a particular point during a round of a card game. The information identifies cards that have been revealed to the player and a number of cards that have not been revealed to the player. An estimation of odds that the player will win the round of the card game is generated. The generating includes repeatedly, for each of the number of cards that has not been revealed to the player and for each remaining card to be dealt in the round, randomly selecting a card from remaining cards in the deck. The estimation of the odds is communicated for integration into a presentation of information pertaining to the card game.

20 Claims, 7 Drawing Sheets

400

AUTOMATED HAND STRENGTH ESTIMATION FOR CARD GAMES

TECHNICAL FIELD

The present disclosure generally relates to automatic monitoring and analysis of games and, in one specific example, to a process of estimating strengths of hands of a card game using computer-implemented background simulations.

BACKGROUND

During a round of a card game, a player has an exact chance of winning the round at any particular point. Having knowledge of this exact chance may increase enjoyment of viewers of the card game, such as one or more of the players or an audience. However, in some contexts, calculating the exact chance (e.g., using a mathematical formula) is computationally intensive and can cause excessive computational load on a computer device executing the game.

BRIEF DESCRIPTION OF THE DRAWINGS

Some embodiments are illustrated by way of example and not limitation in the figures of the accompanying drawings in which.

DETAILED DESCRIPTION

Figure 1:
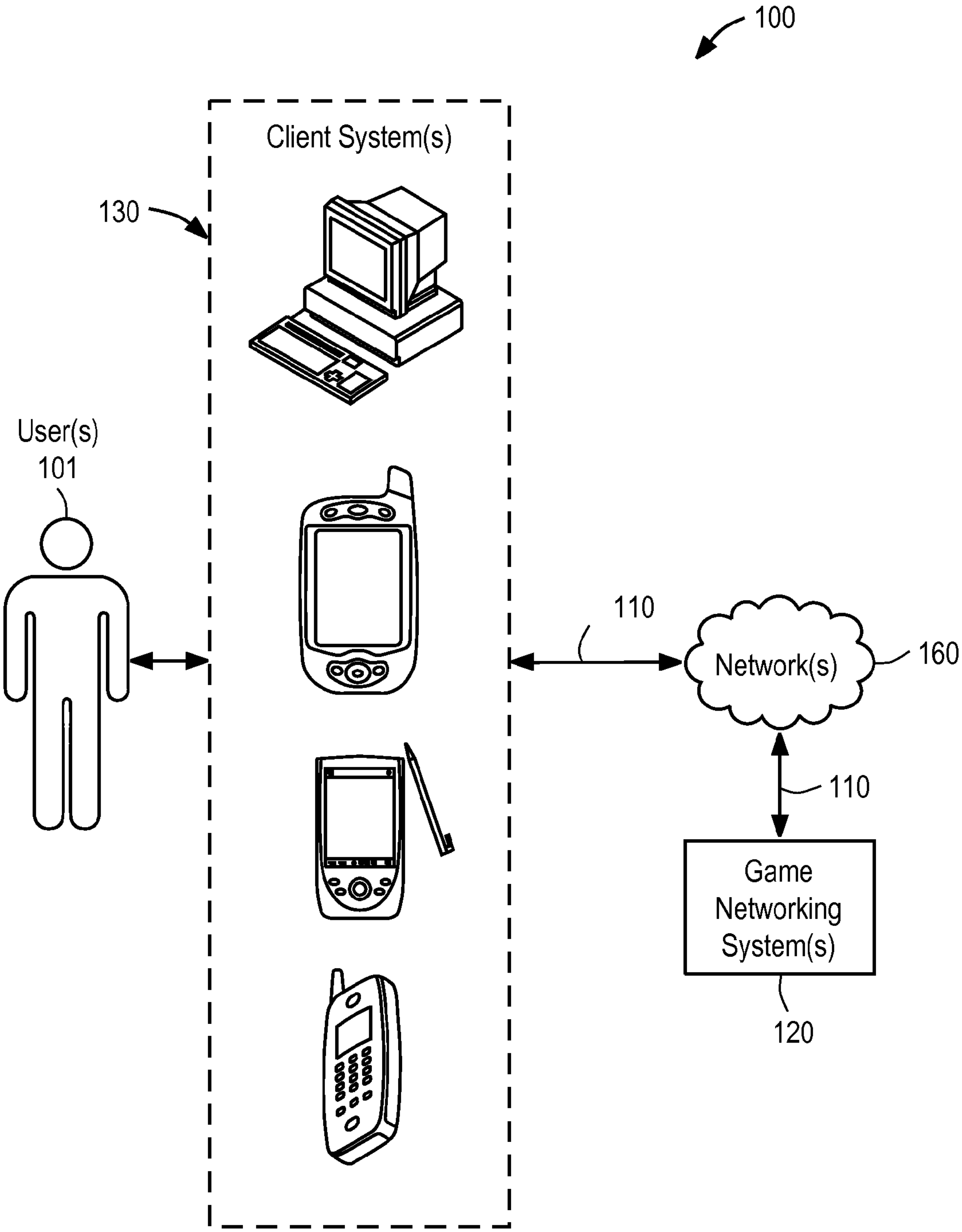
FIG. 1 is a block diagram illustrating an example of a system for implementing various disclosed embodiments.

In the following description, for purposes of explanation, numerous specific details are set forth in order to provide an understanding of various embodiments of the present subject matter. It will be evident, however, to those skilled in the art that various embodiments may be practiced without these specific details.

In various embodiments, a method of estimating odds that a player will win a round of a card game is disclosed. Information is received pertaining to cards that have been dealt from a deck at a particular point during a round of a card game. The information identifies cards that have been revealed to the player and a number of cards that have not been revealed to the player. An estimation of odds that a player will win the round of the card game is generated. The generating includes repeatedly, for each of the number of cards that has not been revealed to the player and for each remaining card to be dealt in the round, randomly selecting a card from remaining cards in the deck. The estimation of the odds is communicated for integration into a presentation of information pertaining to the card game.

In various contexts, it may be impractical to determine the exact odds that a player will win a round of a card game based on a state of the card game. For example, some devices may lack enough physical memory (e.g., hundreds of terabytes) to store pre-calculated percentages for every possible combination of hole cards, community cards, number of opponents, and type of poker. Furthermore, it may not be desirable from a performance or functionality perspective for an application executing on the device to open a communication channel to a server to receive such data. For example, a player may wish to learn the chances of winning a round of a card game executing on the device without having to access a network to retrieve pre-calculated percentages.

As another example, performing a mathematical computation of the odds of the player winning the round of the card game may take too long to execute or require too many resources of the device, such as processing power, based on various performance metrics. For example, if each calculation takes more than threshold amount of time (e.g., two seconds) on the device or if the calculation causes the framerate of an application executing on the device to drop below a certain threshold framerate (e.g., 30 fps), performing the mathematical computation could interfere with the enjoyment of the player in playing the game.

The method disclosed herein enables a system executing the method to provide the player with information pertaining to the odds without causing the performance of the game to be degraded significantly and without requiring any external communication from the device. It does so in part by performing several operations that are less processor-intensive than a full odds calculation and by distributing these operations such that particular configurable thresholds are not transgressed. Such thresholds may include a maximum total time to spend performing the operations, a maximum time per frame to spend performing the operations, and so on, as will be described in more detail below.

FIG. 1 is a block diagram illustrating an example of a system 100 for implementing various disclosed embodiments. In particular embodiments, system 100 comprises user(s) 101, game networking system(s) 120, client system(s) 130, and network(s) 160. The one or more users(s) 101 may also be referred to as one or more player(s); and the player(s) may also be referred to as the user(s) 101. The components of system 100 can be connected to each other in any suitable configuration, using any suitable type of connection. The components may be connected directly or over network(s) 160, which may be any suitable network. For example, one or more portions of network(s) 160 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, another type of network, or a combination of two or more such networks.

Game networking system(s) 120 is a network-addressable computing system that can host one or more online games. Game networking system(s) 120 can generate, store, receive, and transmit game-related data, such as, for example, game account data, game input, game state data, and game displays. Game networking system(s) 120 can be accessed by the other components of system 100 either directly or via network(s) 160. Players (e.g., user(s) 101) may use client system(s) 130 to access, send data to, and receive data from game networking system(s) 120. Client system(s) 130 can access game networking system(s) 120 directly, via network 160, or via a third-party system. Client system(s) 130 can be any suitable computing device, such as a personal computer, laptop, cellular phone, smart phone, computing tablet, and the like.

Although FIG. 1 illustrates a particular number of user(s) 101, game networking system(s) 120, client system(s) 130, and network(s) 160, this disclosure contemplates any suitable number of users 101, game networking systems 120, client systems 130, and networks 160. Although FIG. 1 illustrates a particular arrangement of user(s) 101, game networking system(s) 120, client system(s) 130, and network(s) 160, this disclosure contemplates any suitable arrangement of user(s) 101, game networking system(s) 120, client system(s) 130, and network(s) 160.

The components of system 100 may be connected to each other using any suitable connections 110. For example, suitable connections 110 include wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) connections. In particular embodiments, one or more connections 110 each include one or more of an ad hoc network, an intranet, an extranet, a VPN, a LAN, a WLAN, a WAN, a WWAN, a MAN, a portion of the Internet, a portion of the PSTN, a cellular telephone network, or another type of connection, or a combination of two or more such connections. Connections 110 need not necessarily be the same throughout system 100. One or more first connections 110 may differ in one or more respects from one or more second connections 110. Although FIG. 1 illustrates particular connections between user(s) 101, game networking system(s) 120, client system(s) 130, and network(s) 160, this disclosure contemplates any suitable connections between user(s) 101, game networking system(s) 120, client system(s) 130, and network(s) 160. As an example and not by way of limitation, in particular embodiments, client system(s) 130 may have a direct connection to game networking system(s) 120, thereby bypassing network(s) 160.

In an online computer game, a game engine manages the game state of the game. Game state comprises all game play parameters, including player character state, non-player character (NPC) state, in-game object state, game world state (e.g., internal game clocks, game environment), and other game play parameters. Each player (e.g., user 101) controls one or more player characters (PCs). The game engine controls all other aspects of the game, including NPCs and in-game objects. The game engine also manages game state, including player character state for currently active (e.g., online) and inactive (e.g., offline) players.

An online game can be hosted by game networking system(s) 120, which can be accessed using any suitable connection with a suitable client system(s) 130. A player may have a game account on game networking system(s) 120, wherein the game account can contain a variety of information associated with the player (e.g., the player's personal information, financial information, purchase history, player character state, game state, etc.). In some embodiments, a player may play multiple games on game networking system(s) 120, which may maintain a single game account for the player with respect to all the games, or multiple individual game accounts for each game with respect to the player. In some embodiments, game networking system(s) 120 can assign a unique identifier to each user 101 of an online game hosted on game networking system(s) 120. Game networking system(s) 120 can determine that a user 101 is accessing the online game by reading the user's 101 cookies, which may be appended to Hypertext Transfer Protocol (HTTP) requests transmitted by client system(s) 130, and/or by the user 101 logging onto the online game.

In particular embodiments, user(s) 101 may access an online game and control the game's progress via client system(s) 130 (e.g., by inputting commands to the game at the client device). Client system(s) 130 can display the game interface, receive inputs from user(s) 101, transmit user inputs or other events to the game engine, and receive instructions from the game engine. The game engine can be executed on any suitable system (such as, for example, client system(s) 130, or game networking system(s) 120). As an example and not by way of limitation, client system(s) 130 can download client components of an online game, which are executed locally, while a remote game server, such as game networking system(s) 120, provides backend support for the client components and may be responsible for maintaining application data of the game, processing the inputs from the player, updating and/or synchronizing the game state based on the game logic and each input from the player, and transmitting instructions to client system(s) 130. As another example and not by way of limitation, each time a player (e.g., a user 101) provides an input to the game through the client system(s) 130 (such as, for example, by typing on the keyboard or clicking the mouse of client system(s) 130), the client components of the game may transmit the player's input to game networking system(s) 120.

In many computer games, there are various types of in-game assets (aka "rewards" or "loot") that a player character can obtain within the game. For example, a player character may acquire game points, gold coins, experience points, character levels, character attributes, virtual cash, game keys, or other in-game items of value. In many computer games, there are also various types of in-game obstacles that a player must overcome to advance within the game. In-game obstacles can include tasks, puzzles, opponents, levels, gates, actions, and so forth. In some games, a goal of the game may be to acquire certain in-game assets, which can then be used to complete in-game tasks or to overcome certain in-game obstacles. For example, a player may be able to acquire a virtual key (i.e., the in-game asset) that can then be used to open a virtual door (i.e., the in-game obstacle).

In an online multiplayer game, players may control player characters (PCs) and a game engine controls non-player characters (NPCs) and game features. The game engine also manages player character state and game state and tracks the state for currently active (i.e., online) players and currently inactive (i.e., offline) players. A player character can have a set of attributes and a set of friends associated with the player character. As used herein, the term "player character state" can refer to any in-game characteristic of a player character, such as location, assets, levels, condition, health, status, inventory, skill set, name, orientation, affiliation, specialty, and so on. Player characters may be displayed as graphical avatars within a user interface of the game. In other implementations, no avatar or other graphical representation of the player character is displayed. Game state encompasses the notion of player character state and refers to any parameter value that characterizes the state of an in-game element, such as a non-player character, a virtual object (such as a wall or castle), and so forth. The game engine may use player character state to determine the outcome of game events, sometimes also considering set or random variables. Generally, a player character's probability of having a more favorable outcome is greater when the player character has a better state. For example, a healthier player character is less likely to die in a particular encounter relative to a weaker player character or non-player character. In some embodiments, the game engine can assign a unique client identifier to each player.

In particular embodiments, user(s) 101 may access particular game instances of an online game. A game instance is a copy of a specific game play area that is created during runtime. In particular embodiments, a game instance is a discrete game play area where one or more user(s) 101 can interact in synchronous or asynchronous play. A game instance may be, for example, a level, zone, area, region, location, virtual space, or other suitable play area. A game instance may be populated by one or more in-game objects. Each object may be defined within the game instance by one or more variables, such as, for example, position, height, width, depth, direction, time, duration, speed, color, and other suitable variables. A game instance may be exclusive (i.e., accessible by specific players) or non-exclusive (i.e., accessible by any player). In particular embodiments, a game instance is populated by one or more player characters controlled by one or more user(s) 101 and one or more in-game objects controlled by the game engine. When accessing an online game, the game engine may allow user(s) 101 to select a particular game instance to play from a plurality of game instances. Alternatively, the game engine may automatically select the game instance that user(s) 101 will access. In particular embodiments, an online game comprises only one game instance that all user(s) 101 of the online game can access.

In particular embodiments, a specific game instance may be associated with one or more specific players. A game instance is associated with a specific player when one or more game parameters of the game instance are associated with the specific player. As an example and not by way of limitation, a game instance associated with a first player may be named "First Player's Play Area." This game instance may be populated with the first player's PC and one or more in-game objects associated with the first player. In particular embodiments, a game instance associated with a specific player may only be accessible by that specific player. As an example and not by way of limitation, a first player may access a first game instance when playing an online game, and this first game instance may be inaccessible to all other players. In other embodiments, a game instance associated with a specific player may be accessible by one or more other players, either synchronously or asynchronously with the specific player's game play. As an example and not by way of limitation, a first player may be associated with a first game instance, but the first game instance may be accessed by all first-degree friends in the first player's social network. In particular embodiments, the game engine may create a specific game instance for a specific player when that player accesses the game. As an example and not by way of limitation, the game engine may create a first game instance when a first player initially accesses an online game, and that same game instance may be loaded each time the first player accesses the game. As another example and not by way of limitation, the game engine may create a new game instance each time a first player accesses an online game, wherein each game instance may be created randomly or selected from a set of predetermined game instances. In particular embodiments, the set of in-game actions available to a specific player may be different in a game instance that is associated with that player compared to a game instance that is not associated with that player. The set of in-game actions available to a specific player in a game instance associated with that player may be a subset, superset, or independent of the set of in-game actions available to that player in a game instance that is not associated with him. As an example and not by way of limitation, a first player may be associated with Blackacre Farm in an online farming game. The first player may be able to plant crops on Blackacre Farm. If the first player accesses a game instance associated with another player, such as Whiteacre Farm, the game engine may not allow the first player to plant crops in that game instance. However, other in-game actions may be available to the first player, such as watering or fertilizing crops on Whiteacre Farm.

In particular embodiments, a game engine can interface with a social graph. Social graphs are models of connections between entities (e.g., individuals, users, contacts, friends, players, player characters, non-player characters, businesses, groups, associations, concepts, etc.). These entities are considered "users" of the social graph; as such, the terms "entity" and "user" may be used interchangeably when referring to social graphs herein. A social graph can have a node for each entity and edges to represent relationships between entities. A node in a social graph can represent any entity. In particular embodiments, a unique client identifier can be assigned to each user in the social graph. This disclosure assumes that at least one entity of a social graph is a player or player character in an online multiplayer game, though this disclosure contemplates any suitable social graph users.

The minimum number of edges required to connect a player (or player character) to another user is considered the degree of separation between them. For example, where the player and another user are directly connected (one edge), they are deemed to be separated by one degree of separation. The other user would be a so-called "first-degree friend" of the player. Where the player and the other user are connected through one other user (two edges), they are deemed to be separated by two degrees of separation. The other user would be a so-called "second-degree friend" of the player. Where the player and the other user are connected through N edges (or N−1 other users), they are deemed to be separated by N degrees of separation. The other user would be a so-called "Nth-degree friend." As used herein, the term "friend" means only first-degree friends, unless context suggests otherwise.

Within the social graph, each player (or player character) has a social network. A player's social network includes all users in the social graph within Nmax degrees of the player, where Nmax is the maximum degree of separation allowed by the system managing the social graph (such as, for example, game networking system(s) 120). In one embodiment, Nmax equals 1, such that the player's social network includes only first-degree friends. In another embodiment, Nmax is unlimited and the player's social network is coextensive with the social graph.

In particular embodiments, the social graph is managed by game networking system(s) 120, which is managed by the game operator. In other embodiments, the social graph is part of a social networking system managed by a third-party (e.g., Facebook, Friendster, Myspace). In yet other embodiments, user 101 has a social network on both game networking system(s) 120 and a social networking system, wherein user(s) 101 can have a social network on the game networking system(s) 120 that is a subset, superset, or independent of the user's 101 social network on the social networking system. In such combined systems, game networking system(s) 120 can maintain social graph information with edge type attributes that indicate whether a given friend is an "in-game friend," an "out-of-game friend," or both. The various embodiments disclosed herein are operable when the social graph is managed by the social networking system, game networking system(s) 120, or both.

Figure 2:
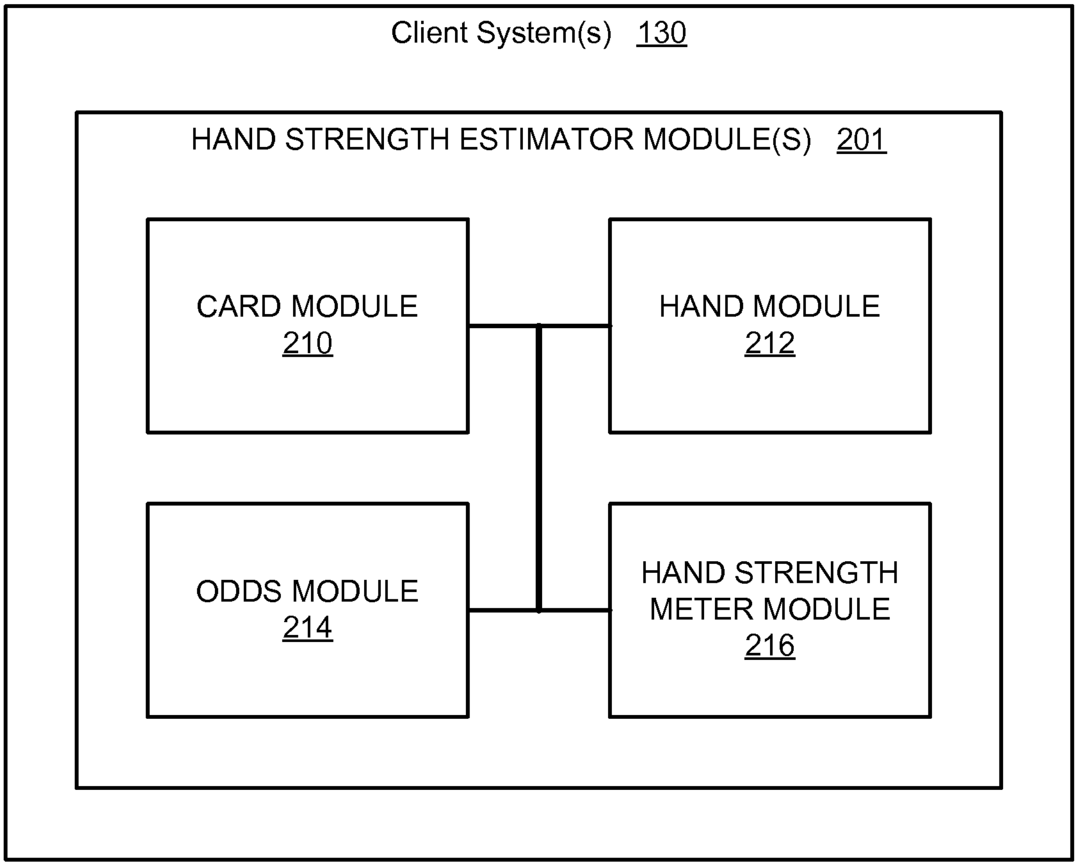
FIG. 2 is a block diagram illustrating an example embodiment of one of the client systems of FIG. 1.

FIG. 2 is a block diagram illustrating an example hand strength estimator module(s) 201 that are configured to communicate estimations of odds that a player will win a round of a card game based on a current state of the card game.

A card module 210 is configured to provide data structures and functions pertaining to cards used in a card game. For example, the card module 210 may provide a definition of a card that includes a suit and a rank. Additionally, the card module 210 may provide a function that compares the strength of two cards based on the rules of a particular card game. For example, for a Texas Hold 'Em card game, the comparison function may indicate that an Ace of Spades has a higher rank than a King of Spades, an Ace of Spades and a King of Spades have the same rank, and so on.

A hand module 212 is configured to provide data structures and functions pertaining to hands of cards in the card game. For example, for a Texas Hold 'Em card game, the hand module 212 may return a player's best five-card poker hand given two hole cards of the player and three or more revealed community cards. Additionally, the hand module 212 may, given multiple hands, compare the strengths of the hands (e.g., indicate whether one of the multiple hands is better, worse, or equal in strength to each of the other multiple hands). For example, for a Texas Hold 'Em card game, the hand module 212 may be configured to identify a poker hand (e.g., as one of a high card, pair, two pair, three of a kind, straight, flush, full house, four of a kind, or straight flush). Furthermore, the hand module 212 may be configured to rank a hand against any other hand (e.g., for a Texas Hold 'Em card game, indicating that a pair of Kings beats an Ace high, a pair of Aces beats a pair of Kings, etc.).

An odds module 214 is configured to determine the odds that a player will win a round of a card game given a particular game state. For example, in a Texas Hold 'Em game, the odds module 214 may determine cards that have been revealed to a player at a particular point in the game (e.g., after the hole cards have been dealt to the player, after the flop has been dealt, after the turn has been dealt, or after the river has been dealt). Additionally, at that particular point, the odds module 214 may determine a number of cards that have been dealt but that are unknown to the player, such as the number of hole cards of players who have not folded their hands, and the number of cards that have not been dealt, such as community cards that have not been dealt. Then, as described in more detail below, the odds module 214 may perform repeated background simulations of the round being played to completion. Each simulation may include randomly selecting cards from the remaining cards in the deck for each of the unknown cards and undealt cards. The results of the repeated simulations may then be used to determine an average win rate of the player. In other words, odds for in-game success of a particular hand and/or player-selectable gameplay option is estimated based on multiple iterations of a simulation of further gameplay based on the current game state. This is to be contrasted with odds calculation using an analytical mathematics.

A hand strength meter (HSM) module 216 is configured to perform various operations, including invoking the odds module when the game state changes (e.g., whenever a new hand is dealt, additional cards are dealt, additional cards are revealed to the user, or a player folds). Additionally, the HSM module 216 is configured to allow input (e.g., from a designer, developer, or administrator) to specify HSM parameters, such as a simulation time limit (STL), simulation count limit (SCL), a per frame limit on the number of simulations to run (FSCL), a maximum percentage to reflect an increase in a displayed value for a given frame (e.g., so that transitions from a low value to a high value are smooth), a minimum percentage difference between an estimate and a displayed value that is required for updating the displayed value (e.g., so there is not constant teetering between nearly equivalent values), and a number of decimal places to include in the displayed value. Additionally, the HSM module 216 may be configured to generate a visual representation of the estimated hand strength for presentation to the user (e.g., for presentation in a user interface or for integration into a television broadcast).

Figure 3:
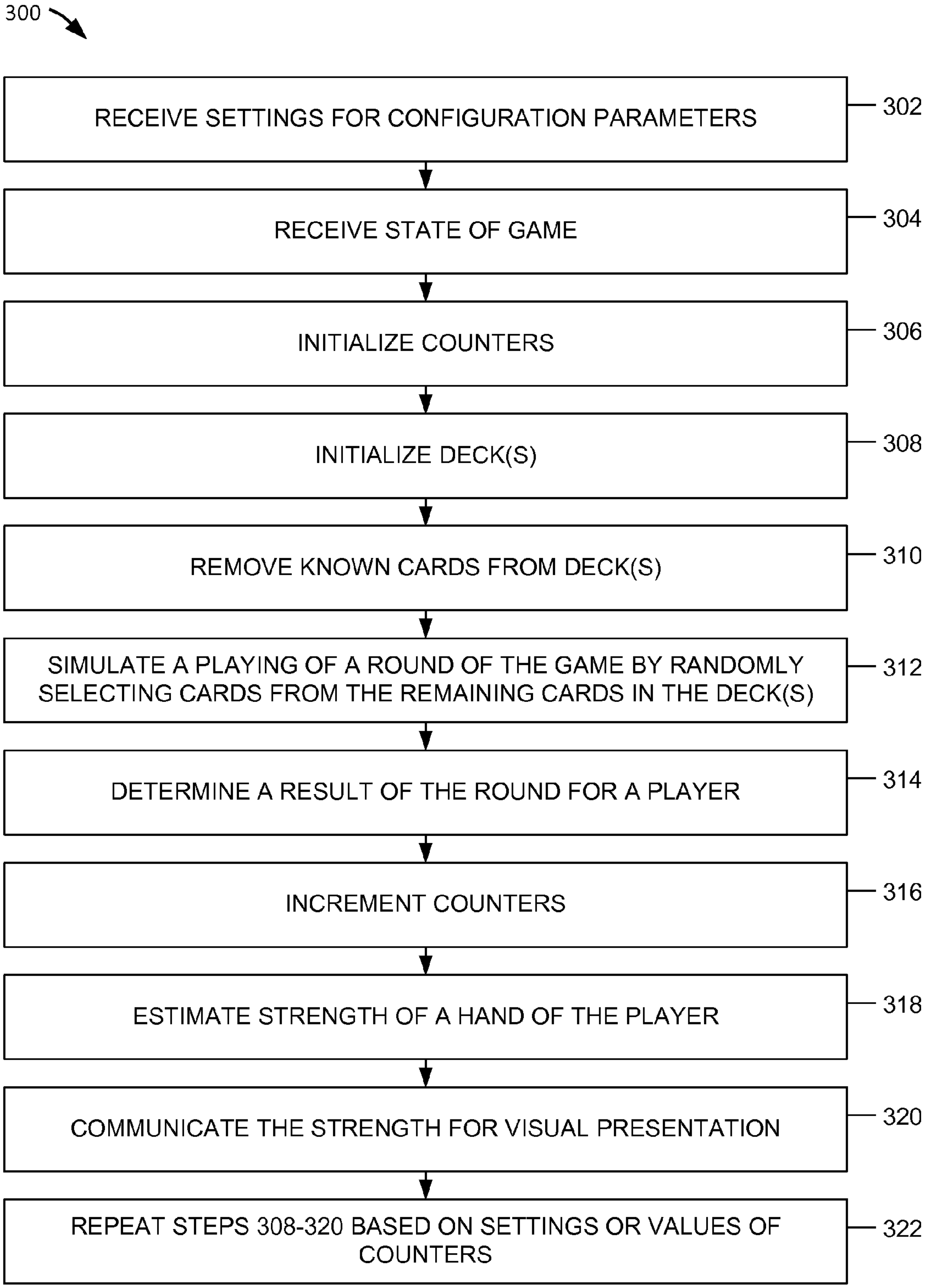
FIG. 3 is a flow chart of an example embodiment of a method of estimating a strength of a hand of a player of a card game at a particular point during the card game.

FIG. 3 is a flow chart illustrating an example method 300 of estimating the strength of a hand of a player at a particular point during a card game. In various embodiments, the operations may be performed by one or more of the hand strength estimator module(s) 201.

At operation 302, the hand strength meter module 216 may receive settings for configuration parameters related to estimating a strength of a hand of a player during a round of the game. Such configuration parameters may include settings for the STL, SCL, FSTL, and FSCL. Any combination of settings may be specified. For example, the STL may be set to 15 ms, the SCL may be set to 1000, the FSTL may be set to 2 ms, and the FSCL may be set to 100. Additionally, the hand strength meter module 216 may receive settings for configuration parameters related to communicating the estimation for visual display. For example, the hand strength meter module 216 may receive settings of configuration parameters pertaining to the maximum percentage to increase a displayed value by in a given frame, a minimum percentage required in order to update the winning percentage displayed, and a number of decimal places of the estimated value to display.

At operation 304, the hand strength meter module 216 may receive a state of the game. The game state may include data items pertaining to a number of decks that are being used, identification of revealed cards, a number unrevealed hands or cards (e.g., hole cards dealt to players), and number of cards left to be dealt (e.g., community or hole cards). Thus, for example, in a Texas Hold 'Em card game, the game state may indicate how many players have not folded their hole cards, a number of hole cards for each player that have not been revealed, identification of which, if any, of the hole cards have been revealed, identification of the hole cards of the player for which the hand strength is to be measured, identification of any community cards that have been dealt and revealed, and a number of community cards that have not yet been dealt.

Based on a determination that the received state of the game differs from a previous state of the game in a manner that is relevant to estimating the hand strength of the player (e.g., based on a determination that a new hand has been dealt, additional cards have been dealt, additional card have been revealed, or a player folds), the hand strength meter module 216 may start a process for performing the estimation. This process may include invoking the odds module 214.

At operation 306, the odds module 214 may initialize various counters pertaining to the estimation. For example, a counter for total hands won (THW) may be set to 0 and a counter for total hands simulated (THS) may be set to 0.

At operation 308, the odds module 214 may create or initialize a deck to be used in performing simulations to estimate the hand strength of a player. For example, for a single-deck card game, a single deck of cards may be created for simulation purposes. The deck may consist of cards as defined by the card module 210. Thus, for Texas Hold 'Em, the deck may comprise cards having a rank and a suit.

At operation 310, the odds module 214 may remove known cards from the deck. For example, if the received game state includes identification of the hole cards of the player and particular cards that have been revealed (e.g., hole cards of other players or community cards), the hand strength meter module 216 may remove those identified cards from the deck. In various embodiments, upon subsequent initializations of the deck a particular point in a round of a card game, the deck may be initialized to the result obtained after the known cards are removed such that operation 310 need only be performed once for the particular point of the round of the card game.

At operation 312, the odds module 214 may simulate a playing of a round of the card game to completion from a particular point as determined from the game state. For example, the hand strength meter module 216 may randomly select cards from the remaining cards in the deck to associate with each of the unknown and undealt cards. Thus, in a Texas Hold 'Em card game, if the game state indicates that there are three players remaining in the hand, that only the hole cards of the player for whom the estimation is being performed are known, and that the flop has been dealt, the hand strength meter module 216 may select cards randomly from the remaining cards in the deck for each of the hole cards of the other two players and for the turn and river cards.

At operation 314, upon completing the random selection of the cards necessary for playing the round to completion, the odds module 214 may determine a result of the round for the player for whom the estimate is being performed. For example, the hand strength meter module 216 may compare the hand of the player for whom the estimate is being performed to the hands of the other players (e.g., using the hand module 212) to determine whether the player won or lost the simulated round.

At operation 316, the odds module 214 may increment counters pertaining to the estimation. For example, the odds module 214 may increment the THS counter. Furthermore, if the player for whom the estimate is being performed won the hand, the odds module 214 may also increment the THW counter.

At operation 318, the odds module 214 may estimate the strength of the hand of the player. The estimate may be based on aggregation of a result of the most recently performed simulation and previously performed simulations. In various embodiments, the estimation may be calculated as the percentage of THW to THS.

At operation 320, the hand strength meter module 216 may communicate the estimation for visual presentation (e.g., for presentation in a user interface of a card game application or for broadcast on a television screen). In various embodiments, whether the estimate is communicated may be based on settings of the configuration parameters described above, including the maximum percentage to increase a displayed value by in a given frame (e.g., so that the transitions from a low value to a high value are smooth), a minimum percentage required in order to update the winning percentage displayed (e.g., so that there is not teetering between nearly equivalent values), and the number of decimal places of the estimation to display.

At operation 322, the hand strength meter module 216 may repeat operations 308-322 based on settings of configuration parameters or values of counters. For example, if none of the thresholds specified by the configuration parameters have been exceeded, including the STL, SCL, FSTL, and FSCL thresholds, the hand strength meter module 216 may repeat the simulation process, starting from operation 308.

Figure 4:
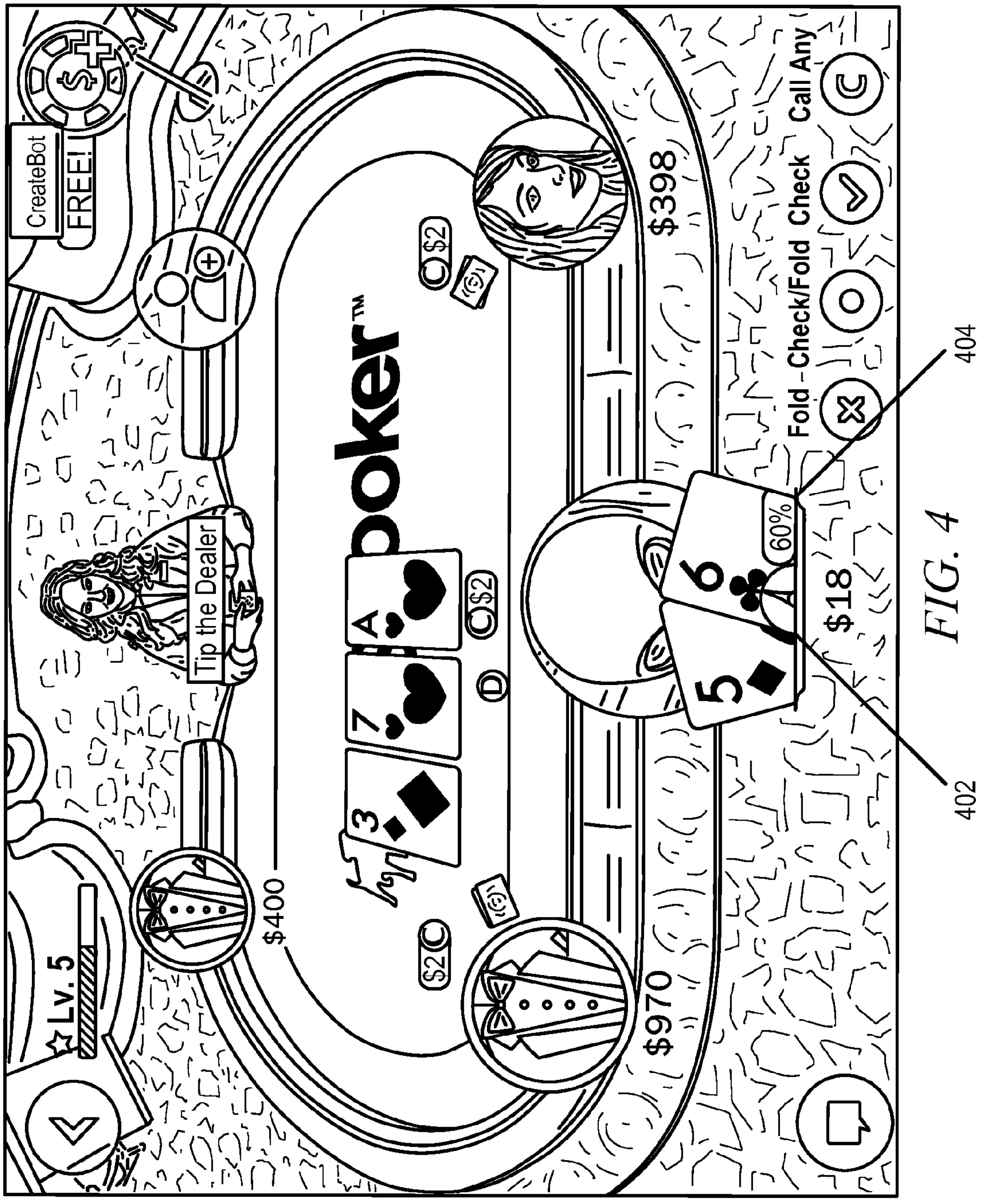
FIG. 4 is a screenshot of an example user interface in which an estimated hand strength is visually presented.

FIG. 4 is a screenshot of a user interface 400 of a Texas Hold 'Em card game application into which visual representations of the estimated strength of a player's hand during a round of the card game have been incorporated. A gauge 402 indicates an estimated chance that the player will win the hand on a scale of 0 to 100%. The gauge pointer may be continually updated as the estimation becomes more refined (e.g., as more simulations are completed), even when the game state has not changed. A label 404 may include a textual representation of the estimation (e.g., "60%"). Like the gauge, the value in the label 404 may be continually updated as the estimation becomes more refined, even between game state changes.

Figure 5:
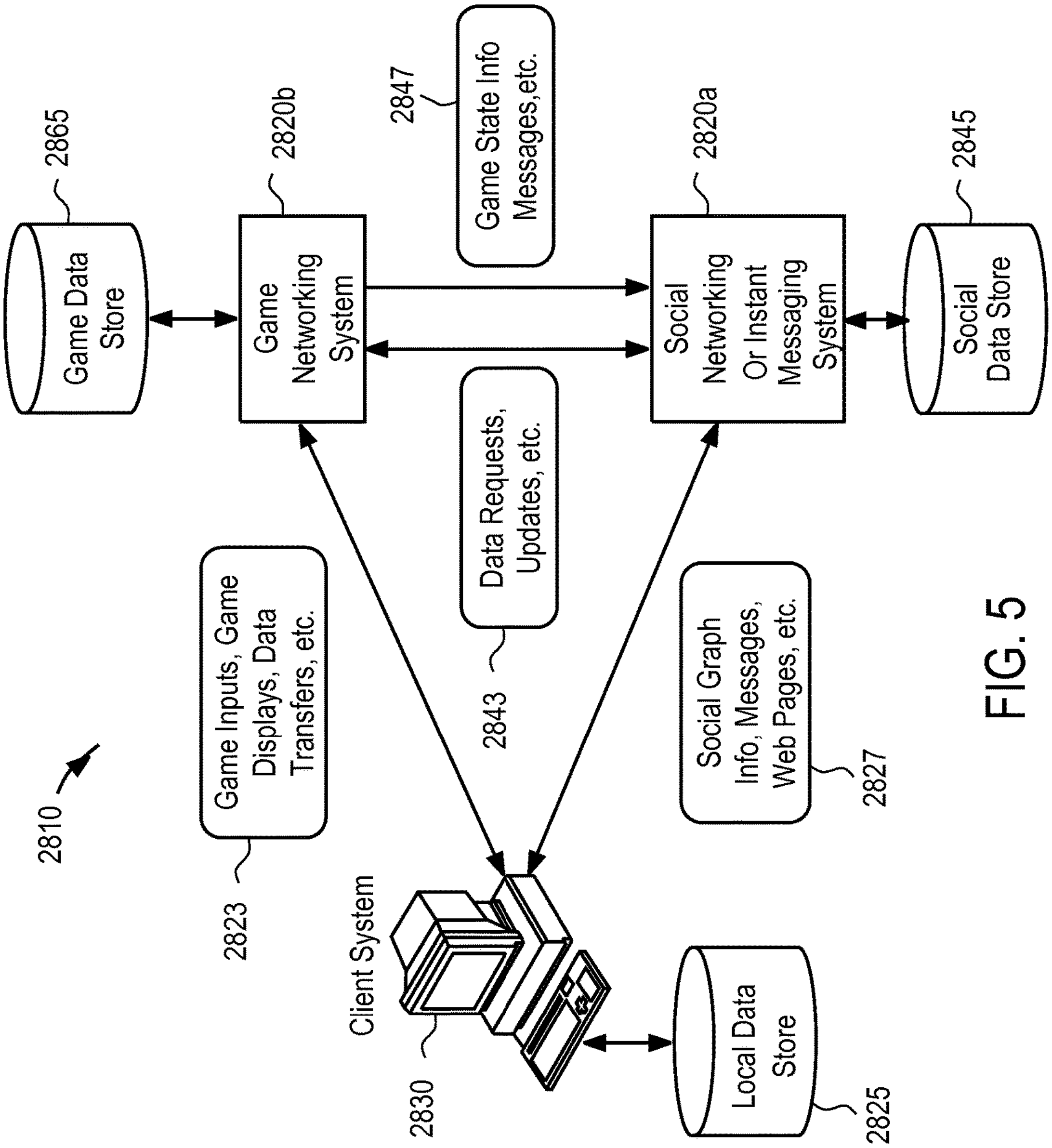
FIG. 5 is a block diagram illustrating an example data flow between the components of an example system.

FIG. 5 is a block diagram illustrating an example data flow between the components of system 2810. In particular embodiments, system 2810 can include client system 2830, social networking system 2820*a*, and game networking system 2820*b*. The components of system 2810 can be connected to each other in any suitable configuration, using any suitable type of connection. The components may be connected directly or over any suitable network. Client system 2830, social networking system 2820*a*, and game networking system 2820*b* can each have one or more corresponding data stores such as local data store 2825, social data store 2845, and game data store 2865, respectively. Social networking system 2820*a* and game networking system 2820*b* can also have one or more servers that can communicate with client system 2830 over an appropriate network. Social networking system 2820*a* and game networking system 2820*b* can have, for example, one or more internet servers for communicating with client system 2830 via the Internet. Similarly, social networking system 2820*a* and game networking system 2820*b* can have one or more mobile servers for communicating with client system 2830 via a mobile network (e.g., GSM, PCS, Wi-Fi, WPAN, etc.). In some embodiments, one server may be able to communicate with client system 2830 over both the Internet and a mobile network. In other embodiments, separate servers can be used.

Client system 2830 can receive and transmit data 2823 to and from game networking system 2820*b*. This data can include, for example, webpages, messages, game inputs, game displays, HTTP packets, data requests, transaction information, updates, and other suitable data. At some other time, or at the same time, game networking system 2820*b* can communicate data 2843, 2847 (e.g., game state information, game system account information, page info, messages, data requests, updates, etc.) with other networking systems, such as social networking system 2820*a* (e.g., Facebook, Myspace, etc.). Client system 2830 can also receive and transmit data 2827 to and from social networking system 2820*a*. This data can include, for example, webpages, messages, social graph information, social network displays, HTTP packets, data requests, transaction information, updates, and other suitable data.

Communication between client system 2830, social networking system 2820*a*, and game networking system 2820*b* can occur over any appropriate electronic communication medium or network using any suitable communications protocols. For example, client system 2830, as well as various servers of the systems described herein, may include Transport Control Protocol/Internet Protocol (TCP/IP) networking stacks to provide for datagram and transport functions. Of course, any other suitable network and transport layer protocols can be utilized.

In addition, hosts or end-systems described herein may use a variety of higher layer communications protocols, including client-server (or request-response) protocols, such as the HyperText Transfer Protocol (HTTP and other communications protocols, such as HTTP-S, FTP, SNMP, TELNET, and a number of other protocols may be used). In addition, a server in one interaction context may be a client in another interaction context. In particular embodiments, the information transmitted between hosts may be formatted as HTML documents. Other structured document languages or formats can be used, such as XML and the like. Executable code objects, such as JavaScript and ActionScript, can also be embedded in the structured documents.

In some client-server protocols, such as the use of HTML over HTTP, a server generally transmits a response to a request from a client. The response may comprise one or more data objects. For example, the response may comprise a first data object, followed by subsequently transmitted data objects. In particular embodiments, a client request may cause a server to respond with a first data object, such as an HTML page, which itself refers to other data objects. A client application, such as a browser, will request these additional data objects as it parses or otherwise processes the first data object.

In particular embodiments, an instance of an online game can be stored as a set of game state parameters that characterize the state of various in-game objects, such as, for example, player character state parameters, non-player character parameters, and virtual item parameters. In particular embodiments, game state is maintained in a database as a serialized, unstructured string of text data as a so-called Binary Large Object (BLOB). When a player accesses an online game on game networking system 2820*b*, the BLOB containing the game state for the instance corresponding to the player can be transmitted to client system 2830 for use by a client-side executed object to process. In particular embodiments, the client-side executable may be a Flash-based game, which can de-serialize the game state data in the BLOB. As a player plays the game, the game logic implemented at client system 2830 maintains and modifies the various game state parameters locally. The client-side game logic may also batch game events, such as mouse clicks, and transmit these events to game networking system 2820*b*. Game networking system 2820*b* may itself operate by retrieving a copy of the BLOB from a database or an intermediate memory cache (memcache) layer. Game networking system 2820*b* can also de-serialize the BLOB to resolve the game state parameters and execute its own game logic based on the events in the batch file of events transmitted by the client to synchronize the game state on the server side. Game networking system 2820*b* may then re-serialize the game state, now modified, into a BLOB and pass this to a memory cache layer for lazy updates to a persistent database.

With a client-server environment in which the online games may run, one server system, such as game networking system 2820*b*, may support multiple client systems 2830. At any given time, there may be multiple players at multiple client systems 2830 all playing the same online game. In practice, the number of players playing the same game at the same time may be very large. As the game progresses with each player, multiple players may provide different inputs to the online game at their respective client systems 2830, and multiple client systems 2830 may transmit multiple player inputs and/or game events to game networking system 2820*b* for further processing. In addition, multiple client systems 2830 may transmit other types of application data to game networking system 2820*b*.

In particular embodiments, a computer-implemented game may be a text-based or turn-based game implemented as a series of web pages that are generated after a player selects one or more actions to perform. The web pages may be displayed in a browser client executed on client system 2830. As an example and not by way of limitation, a client application downloaded to client system 2830 may operate to serve a set of webpages to a player. As another example and not by way of limitation, a computer-implemented game may be an animated or rendered game executable as a stand-alone application or within the context of a webpage or other structured document. In particular embodiments, the computer-implemented game may be implemented using Adobe Flash-based technologies. As an example and not by way of limitation, a game may be fully or partially implemented as a SWF object that is embedded in a web page and executable by a Flash media player plug-in. In particular embodiments, one or more described webpages may be associated with or accessed by social networking system 2820*a*. This disclosure contemplates using any suitable application for the retrieval and rendering of structured documents hosted by any suitable network-addressable resource or website.

Application event data of a game is any data relevant to the game (e.g., player inputs). In particular embodiments, each application datum may have a name and a value, and the value of the application datum may change (i.e., be updated) at any time. When an update to an application datum occurs at client system 2830, either caused by an action of a game player or by the game logic itself, client system 2830 may need to inform game networking system 2820*b* of the update. For example, if the game is a farming game with a harvest mechanic (such as Zynga FarmVille), an event can correspond to a player clicking on a parcel of land to harvest a crop. In such an instance, the application event data may identify an event or action (e.g., harvest) and an object in the game to which the event or action applies. For illustration purposes and not by way of limitation, system 2810 is discussed in reference to updating a multi-player online game hosted on a network-addressable system (such as, for example, social networking system 2820*a* or game networking system 2820*b*), where an instance of the online game is executed remotely on a client system 2830, which then transmits application event data to the hosting system such that the remote game server synchronizes the game state associated with the instance executed by the client system 2830.

In a particular embodiment, one or more objects of a game may be represented as an Adobe Flash object. Flash may manipulate vector and raster graphics, and supports bidirectional streaming of audio and video. "Flash" may mean the authoring environment, the player, or the application files. In particular embodiments, client system 2830 may include a Flash client. The Flash client may be configured to receive and run Flash applications or game object codes from any suitable networking system (such as, for example, social networking system 2820*a* or game networking system 2820*b*). In particular embodiments, the Flash client may be run in a browser client executed on client system 2830. A player can interact with Flash objects using client system 2830 and the Flash client. The Flash objects can represent a variety of in-game objects. Thus, the player may perform various in-game actions on various in-game objects by making various changes and updates to the associated Flash objects. In particular embodiments, in-game actions can be initiated by clicking or similarly interacting with a Flash object that represents a particular in-game object. For example, a player can interact with a Flash object to use, move, rotate, delete, attack, shoot, or harvest an in-game object. This disclosure contemplates performing any suitable in-game action by interacting with any suitable Flash object. In particular embodiments, when the player makes a change to a Flash object representing an in-game object, the client-executed game logic may update one or more game state parameters associated with the in-game object. To ensure synchronization between the Flash object shown to the player at client system 2830, the Flash client may send the events that caused the game state changes to the in-game object to game networking system 2820*b*. However, to expedite the processing and hence the speed of the overall gaming experience, the Flash client may collect a batch of some number of events or updates into a batch file. The number of events or updates may be determined by the Flash client dynamically or determined by game networking system 2820*b* based on server loads or other factors. For example, client system 2830 may send a batch file to game networking system 2820*b* whenever 50 updates have been collected or after a threshold period of time, such as every minute.

As used herein, the term "application event data" may refer to any data relevant to a computer-implemented game application that may affect one or more game state parameters, including, for example and without limitation, changes to player data or metadata, changes to player social connections or contacts, player inputs to the game, and events generated by the game logic. In particular embodiments, each application datum may have a name and a value. The value of an application datum may change at any time in response to the game play of a player or in response to the game engine (e.g., based on the game logic). In particular embodiments, an application data update occurs when the value of a specific application datum is changed. In particular embodiments, each application event datum may include an action or event name and a value (such as an object identifier). Thus, each application datum may be represented as a name-value pair in the batch file. The batch file may include a collection of name-value pairs representing the application data that have been updated at client system 2830. In particular embodiments, the batch file may be a text file and the name-value pairs may be in string format.

In particular embodiments, when a player plays an online game on client system 2830, game networking system 2820*b* may serialize all the game-related data, including, for example and without limitation, game states, game events, and user inputs, for this particular user and this particular game into a BLOB and store the BLOB in a database. The BLOB may be associated with an identifier that indicates that the BLOB contains the serialized game-related data for a particular player and a particular online game. In particular embodiments, while a player is not playing the online game, the corresponding BLOB may be stored in the database. This enables a player to stop playing the game at any time without losing the current state of the game the player is in. When a player resumes playing the game next time, game networking system 2820*b* may retrieve the corresponding BLOB from the database to determine the most-recent values of the game-related data. In particular embodiments, while a player is playing the online game, game networking system 2820*b* may also load the corresponding BLOB into a memory cache so that the game networking system 120 may have faster access to the BLOB and the game-related data contained therein.

In particular embodiments, one or more described webpages may be associated with a networking system or networking service. However, alternate embodiments may have application to the retrieval and rendering of structured documents hosted by any type of network-addressable resource or web site. Additionally, as used herein, a user may be an individual, a group, or an entity (such as a business or third-party application).

Figure 6:
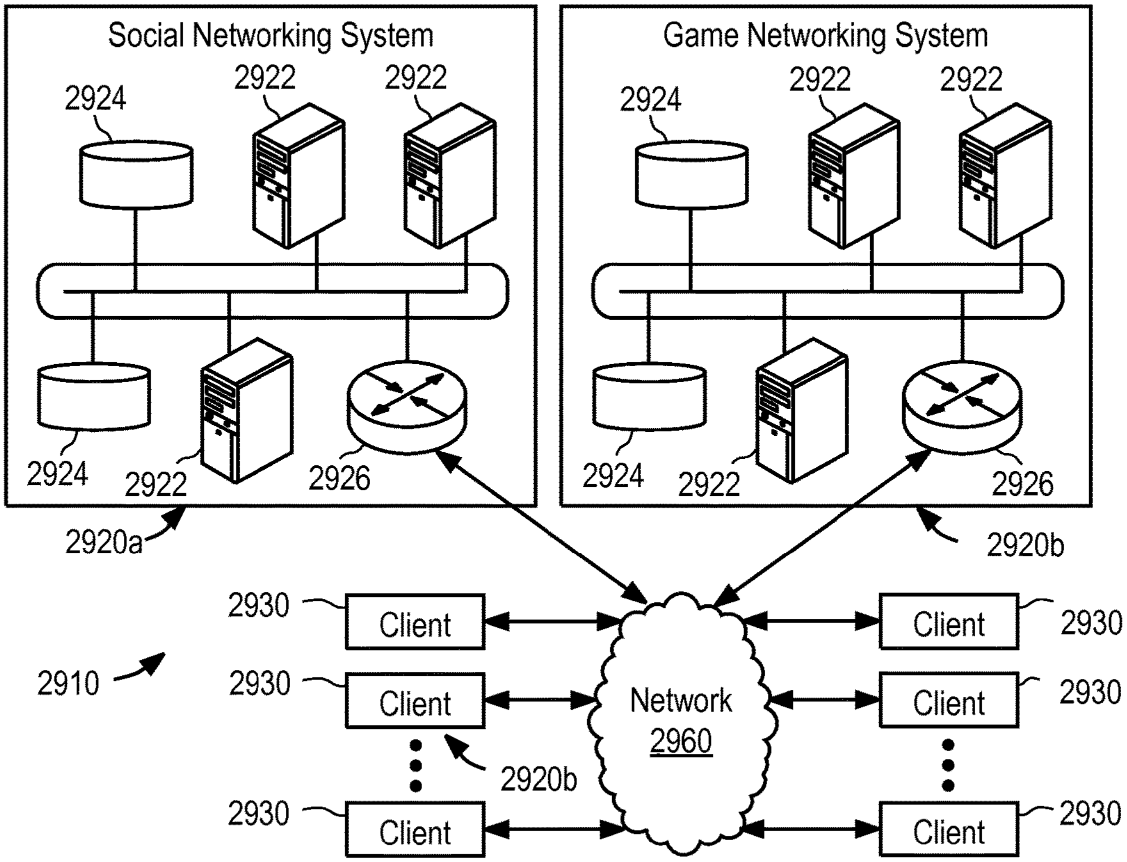
FIG. 6 is a block diagram illustrating an example network environment in which various example embodiments may operate.

Particular embodiments may operate in a wide area network environment, such as the Internet, including multiple network-addressable systems. FIG. 6 is a block diagram illustrating an example network environment 2910, in which various example embodiments may operate. Network cloud 2960 generally represents one or more interconnected networks, over which the systems and hosts described herein can communicate. Network cloud 2960 may include packet-based WANs (such as the Internet), private networks, wireless networks, satellite networks, cellular networks, paging networks, and the like. As FIG. 6 illustrates, particular embodiments may operate in a network environment comprising one or more networking systems, such as social networking system 2920*a*, game networking system 2920*b*, and one or more client systems 2930. The components of social networking system 2920*a* and game networking system 2920*b* operate analogously; as such, hereinafter they may be referred to simply as networking system 2920. Client systems 2930 are operably connected to the network environment 2910 via a network service provider, a wireless carrier, or any other suitable means.

Networking system 2920 is a network-addressable system that, in various example embodiments, comprises one or more physical servers 2922 and data stores 2924. The one or more physical servers 2922 are operably connected to computer network 2960 via, by way of example, a set of routers and/or networking switches 2926. In an example embodiment, the functionality hosted by the one or more physical servers 2922 may include web or HTTP servers, FTP servers, application servers, as well as, without limitation, webpages and applications implemented using Common Gateway Interface (CGI) script, PHP Hyper-text Preprocessor (PHP), Active Server Pages (ASP), HTML, XML, Java, JavaScript, Asynchronous JavaScript and XML (AJAX), Flash, ActionScript, and the like.

Physical servers 2922 may host functionality directed to the operations of networking system 2920. Hereinafter servers 2922 may be referred to as server 2922, although server 2922 may include numerous servers hosting, for example, networking system 2920, as well as other content distribution servers, data stores, and databases. Data store 2924 may store content and data relating to, and enabling, operation of networking system 2920 as digital data objects. A data object, in particular embodiments, is an item of digital information typically stored or embodied in a data file, database, or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects (e.g., games executable within a browser window or frame), podcasts, etc. Logically, data store 2924 corresponds to one or more of a variety of separate and integrated databases, such as relational databases and object-oriented databases, that maintain information as an integrated collection of logically related records or files stored on one or more physical systems. Structurally, data store 2924 may generally include one or more of a large class of data storage and management systems. In particular embodiments, data store 2924 may be implemented by any suitable physical system(s) including components, such as one or more database servers, mass storage media, media library systems, storage area networks, data storage clouds, and the like. In one example embodiment, data store 2924 includes one or more servers, databases (e.g., MySQL), and/or data warehouses. Data store 2924 may include data associated with different networking system 2920 users and/or client systems 2930.

Client system 2930 is generally a computer or computing device including functionality for communicating (e.g., remotely) over a computer network. Client system 2930 may be a desktop computer, laptop computer, personal digital assistant (PDA), in- or out-of-car navigation system, smart phone or other cellular or mobile phone, or mobile gaming device, among other suitable computing devices. Client system 2930 may execute one or more client applications, such as a web browser (e.g., Microsoft Internet Explorer, Mozilla Firefox, Apple Safari, Google Chrome, and Opera), to access and view content over a computer network. In particular embodiments, the client applications allow a user of client system 2930 to enter addresses of specific network resources to be retrieved, such as resources hosted by networking system 2920. These addresses can be Uniform Resource Locators (URLs) and the like. In addition, once a page or other resource has been retrieved, the client applications may provide access to other pages or records when the user "clicks" on hyperlinks to other resources. By way of example, such hyperlinks may be located within the webpages and provide an automated way for the user to enter the URL of another page and to retrieve that page.

A webpage or resource embedded within a webpage, which may itself include multiple embedded resources, may include data records, such as plain textual information, or more complex digitally encoded multimedia content, such as software programs or other code objects, graphics, images, audio signals, videos, and so forth. One prevalent markup language for creating webpages is HTML. Other common web browser-supported languages and technologies include XML, Extensible Hypertext Markup Language (XHTML), JavaScript, Flash, ActionScript, Cascading Style Sheet (CSS), and, frequently, Java. By way of example, HTML enables a page developer to create a structured document by denoting structural semantics for text and links, as well as images, web applications, and other objects that can be embedded within the page. Generally, a webpage may be delivered to a client as a static document; however, through the use of web elements embedded in the page, an interactive experience may be achieved with the page or a sequence of pages. During a user session at the client, the web browser interprets and displays the pages and associated resources received or retrieved from the website hosting the page, as well as, potentially, resources from other websites.

When a user at a client system 2930 desires to view a particular webpage (hereinafter also referred to as a target structured document) hosted by networking system 2920, the user's web browser, or other document rendering engine or suitable client application, formulates and transmits a request to networking system 2920. The request generally includes a URL or other document identifier as well as metadata or other information. By way of example, the request may include information identifying the user, such as a user identifier (ID), as well as information identifying or characterizing the web browser or operating system running on the user's client system 2930. The request may also include location information identifying a geographic location of the user's client system or a logical network location of the user's client system. The request may also include a timestamp identifying when the request was transmitted.

Although the example network environment 2910 described above and illustrated in FIG. 7 is described with respect to social networking system 2920*a* and game networking system 2920*b*, this disclosure encompasses any suitable network environment using any suitable systems. As an example and not by way of limitation, the network environment may include online media systems, online reviewing systems, online search engines, online advertising systems, or any combination of two or more such systems.

In particular embodiments, the hand strength estimator module(s) 201 are part of a standalone application executing on a device. Thus, the hand strength estimator module(s) 201 may be fully functional regardless of any external communications performed by the device, such as client-server communications. Furthermore, the hand strength estimator module(s) 201 may be configured to operate independently of a card game for which the hand strength of a player is being estimated. For example, the hand strength estimator module(s) 201 may be configured to capture necessary input information (e.g., via video capture capabilities of the device) based on information about the card game that is being displayed or streamed to a separate device (e.g., a television). Or the hand strength estimator module(s) 201 may be configured to capture the necessary input from capture (e.g., video capture) of physical cards dealt in a live card game. For example, optical recognition may be incorporated into the hand strength estimator module(s) 201.

In various embodiments, the hand strength estimator module(s) 201 may be configured to capture the necessary inputs by monitoring the execution of a separate card game application executing on the device. In various embodiments, the separate card game may be implemented as a separate standalone executable application on the device. In various embodiments, the separate card game may be implemented as a client-server online card game. In various other embodiments, the hand-strength estimator module(s) 201 may be configured to capture the necessary inputs from the card game (e.g., via analysis of screen captures). Or, in various embodiments, the hand strength estimator module(s) 201 may be configured to receive the input data from the separate card game (e.g., via application program interfaces). In various embodiments, the hand strength estimator module(s) 201 may be configured to integrate the generated user interface pertaining to hand strength with a separate user interface generated by the card game. For example, the hand strength estimator module(s) 201 may be configured to overlay the hand strength user interface over a user interface generated by the card game or present the hand strength user interface alongside the user interface generated by the online card game. In other embodiments, the hand strength estimator module(s) 201 may provide information pertaining to the generation of the user to the online card game (e.g., via an API) for integration by the card game into the user interface of the card game.

Figure 7:
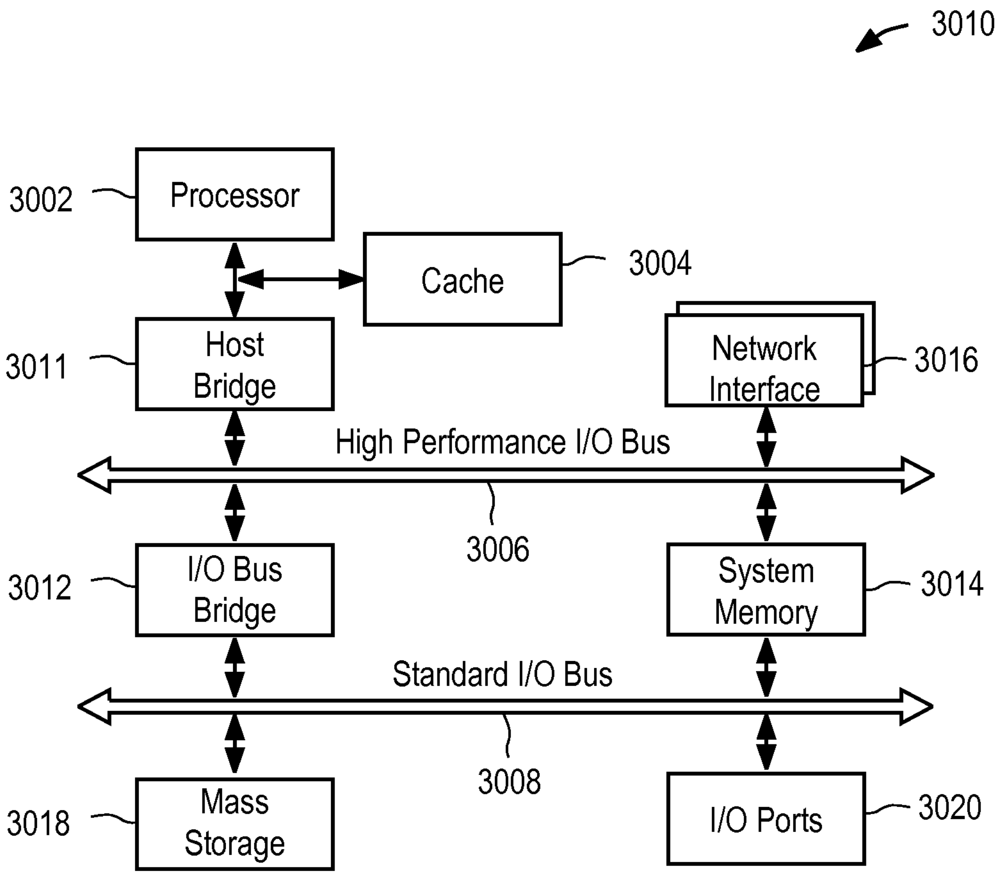
FIG. 7 is a block diagram illustrating an example computing system architecture that may be used to implement a server or a client system.

FIG. 7 is a block diagram illustrating an example computing system architecture, which may be used to implement a server 2922 or a client system 2930 (FIG. 7). In one embodiment, hardware system 3010 comprises a processor 3002, a cache memory 3004, and one or more executable modules and drivers, stored on a tangible computer-readable medium, directed to the functions or methodologies described herein. Additionally, hardware system 3010 may include a high performance input/output (I/O) bus 3006 and a standard I/O bus 3008. A host bridge 3011 may couple processor 3002 to high performance I/O bus 3006, whereas I/O bus bridge 3012 couples the two buses 3006 and 3008 to each other. A system memory 3014 and one or more network/communication interfaces 3016 may couple to bus 3006. Hardware system 3010 may further include video memory (not shown) and a display device coupled to the video memory. Mass storage 3018 and I/O ports 3020 may couple to bus 3008. Hardware system 3010 may optionally include a keyboard, a pointing device, and a display device (not shown) coupled to bus 3008. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 3010 are described in greater detail below. In particular, network interface 3016 provides communication between hardware system 3010 and any of a wide range of networks, such as an Ethernet (e.g., IEEE 802.3) network, a backplane, and so forth. Mass storage 3018 provides permanent storage for the data and programming instructions to perform the above-described functions implemented in servers 2922, whereas system memory 3014 (e.g., DRAM) provides temporary storage for the data and programming instructions when executed by processor 3002. I/O ports 3020 are one or more serial and/or parallel communication ports that provide communication between additional peripheral devices, which may be coupled to hardware system 3010.

Hardware system 3010 may include a variety of system architectures, and various components of hardware system 3010 may be rearranged. For example, cache memory 3004 may be on-chip with processor 3002. Alternatively, cache memory 3004 and processor 3002 may be packed together as a "processor module," with processor 3002 being referred to as the "processor core." Furthermore, certain embodiments of the present disclosure may not require nor include all of the above components. For example, the peripheral devices shown coupled to standard I/O bus 3008 may couple to high performance I/O bus 3006. In addition, in some embodiments, only a single bus may exist, with the components of hardware system 3010 being coupled to the single bus. Furthermore, hardware system 3010 may include additional components, such as additional processors, storage devices, or memories.

An operating system manages and controls the operation of hardware system 3010, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Of course, other embodiments are possible. For example, the functions described herein may be implemented in firmware or on an application-specific integrated circuit. Furthermore, the above-described elements and operations can be comprised of instructions that are stored on non-transitory storage media. The instructions can be retrieved and executed by a processing system. Some examples of instructions are software, program code, and firmware. Some examples of non-transitory storage media are memory devices, tape, disks, integrated circuits, and servers. The instructions are operational when executed by the processing system to direct the processing system to operate in accord with the disclosure. The term "processing system" refers to a single processing device or a group of inter-operational processing devices. Some examples of processing devices are integrated circuits and logic circuitry. Those skilled in the art are familiar with instructions, computers, and storage media.

One or more features from any embodiment may be combined with one or more features of any other embodiment without departing from the scope of the disclosure.

A recitation of "a", "an," or "the" is intended to mean "one or more" unless specifically indicated to the contrary. In addition, it is to be understood that functional operations, such as "awarding," "locating," "permitting" and the like, are executed by game application logic that accesses, and/or causes changes to, various data attribute values maintained in a database or other memory.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

For example, the methods, game features and game mechanics described herein may be implemented using hardware components, software components, and/or any combination thereof. By way of example, while embodiments of the present disclosure have been described as operating in connection with a networking website, various embodiments of the present disclosure can be used in connection with any communications facility that supports web applications. Furthermore, in some embodiments the term "web service" and "website" may be used interchangeably and additionally may refer to a custom or generalized API on a device, such as a mobile device (e.g., cellular phone, smart phone, personal GPS, PDA, personal gaming device, etc.), that makes API calls directly to a server. Still further, while the embodiments described above operate with respect to a poker game, the embodiments can be applied to any game that includes multiple players. The specification and drawings are, accordingly, to be regarded in an illustrative rather than a restrictive sense. It will, however, be evident that various modifications and changes may be made thereunto without departing from the broader spirit and scope of the disclosure as set forth in the claims and that the disclosure is intended to cover all modifications and equivalents within the scope of the following claims.

What is claimed is:

1. A system comprising:

one or more processors of a device;

one or more memories of the device; and one or more modules incorporated into the one or more memories, the one or more modules configuring the one or more processors of the device to generate an estimation of odds that a player will win a round of a card game executing on the device, the generating of the estimation including performing a number of repeated background simulations of the round of the card game being played to completion, the number selected such that the generating of the estimation has a lower computational load than an exact calculation of the odds, the generating of the estimation including, at least:

receiving information pertaining to cards that have been dealt from a deck at a particular point during the round of the card game executing on the device, the information identifying cards that have been revealed to a player and remaining cards that have not been revealed to the player;

performing the selected number of the repeated background simulations of the round of the card game being played to completion, the performing of the selected number of the repeated background simulations including, for each of the cards that has not been revealed to the player and for each remaining card to be dealt in the round of the card game being played within each of the repeated background simulations, randomly selecting a card from the remaining cards;

determining the estimation of the odds that the player will win the round of the card game based on results of the selected number of the repeated background simulations; and communicating the estimation of the odds for integration into a user interface of the card game for presentation on the device as a measure of a strength of the hand.

2. The system of claim 1, wherein the one or more modules are incorporated into a standalone software application that is configured to execute on the device and the card game is executing on the device simultaneously with the standalone software application.

3. The system of claim 1, wherein the card game is a live card game being broadcast for presentation on the device and the one or more modules executing on the device are configured to integrate the estimation into the broadcast for simultaneous presentation on the device in real time.

4. The system of claim 2, wherein the one or more modules are further configured to throttle the selected number of the repeated background simulations to ensure that an average frame rate of the user interface of the card game transgresses a frame rate threshold.

5. The system of claim 1, wherein the particular point is after an additional card has been revealed.

6. The system of claim 1, wherein the particular point is after an additional player has folded a hand.

7. The system of claim 1, wherein the integrating of the estimation of the odds into the user interface includes updating a graphical gauge element repeatedly at a configurable interval during the performing of the selected number of the repeated background simulations.

8. A method comprising:

generate an estimation of odds that a player will win a round of a card game executing on the device, the generating of the estimation including performing a number of repeated background simulations of the round of the card game being played to completion, the number selected such that the generating of the estimation has a lower computational load than an exact calculation of the odds, the generating of the estimation including:

receiving information pertaining to cards that have been dealt from a deck at a particular point during the round of the card game executing on a device, the information identifying cards that have been revealed to the player and remaining cards that have not been revealed to the player;

performing the selected number of the repeated background simulations of the round of the card game being played to completion, the performing of the repeated background simulations including, for each of the cards that has not been revealed to the player and for each remaining card to be dealt in the round of the card game being played within each of the repeated background simulations, randomly selecting a card from the remaining cards;

determining the estimation of the odds that the player will win the round of the card game based on results of the selected number of the repeated background simulations; and communicating the estimation of the odds for integration into a user interface of the card game for presentation on the device as a measure of a strength of the hand, one or more modules incorporated into one or more memories of the device to configure one or more processors of the device to perform the receiving, generating, and communicating.

9. The method of claim 8, wherein the one or more modules are incorporated into a standalone software application that is configured to execute on the device and the card game is executing on the device simultaneously with the standalone software application.

10. The method of claim 8, wherein the card game is a live card game being broadcast for presentation on the device and the one or more modules executing on the device are configured to integrate the estimation into the broadcast for simultaneous presentation on the device in real time.

11. The method of claim 9, wherein the one or more modules are further configured to throttle the selected number of the repeated background simulations to ensure that an average frame rate of the user interface of the card game transgresses a frame rate threshold.

12. The method of claim 8, wherein the particular point is after an additional card has been revealed.

13. The method of claim 8, wherein the particular point is after an additional player has folded a hand.

14. The method of claim 8, wherein the integrating of the estimation of the odds into the user interface includes updating a graphical gauge element repeatedly at a configurable interval during the performing of the selected number of the repeated background simulations.

15. A non-transitory machine-readable storage medium storing a set of instructions as one or more modules that, when incorporated into a device, cause one or more processors of the device to perform operations for generating an estimation of odds that a player will win a round of a card game executing on the device, the generating of the estimation including performing a number of repeated background simulations of the round of the card game being played to completion, the number selected such that the generating of the estimation has a lower computational load than an exact calculation of the odds, the generating of the estimation including, the operations comprising:

receiving information pertaining to cards that have been dealt from a deck at a particular point during the round of the card game executing on a device, the information identifying cards that have been revealed to the player and remaining cards that have not been revealed to the player;

performing the selected number of the repeated background simulations of the round of the card game being played to completion, the performing of the repeated background simulations including, for each of the cards that has not been revealed to the player and for each remaining card to be dealt in the round of the card game being played within each of the repeated background simulations, randomly selecting a card from the remaining cards;

determining the estimation of the odds that the player will win the round of the card game based on results of the selected number of the repeated background simulations; and communicating the estimation of the odds for integration into a user interface of the card game for presentation on the device as a measure of a strength of the hand.

16. The non-transitory machine-readable storage medium of claim 15, wherein the card game is a live card game being broadcast for presentation on the device and the one or more modules executing on the device are configured to integrate the estimation into the broadcast for simultaneous presentation on the device in real time.

17. The non-transitory machine-readable storage medium of claim 16, wherein the one or more modules are further configured to throttle the selected number of the repeated background simulations to ensure that an average frame rate of the user interface of the card game transgresses a frame rate threshold.

18. The non-transitory machine-readable storage medium of claim 15, wherein the particular point is after an additional card has been revealed.

19. The non-transitory machine-readable storage medium of claim 15, wherein the particular point is after an additional player has folded a hand.

20. The non-transitory machine-readable storage medium of claim 15, wherein the integrating of the estimation of the odds into the user interface includes updating a graphical gauge element repeatedly at a configurable interval during the performing of the selected number of the repeated background simulations.

* * * * *